United States Patent
Luo et al.

(10) Patent No.: US 12,521,808 B2
(45) Date of Patent: Jan. 13, 2026

(54) SINGLE-HEAD TIN BALL IMPLANTATION SPRAY HEAD

(71) Applicant: DONGGUAN D-TEK TECHNOLOGY CO., LTD., Guangdong (CN)

(72) Inventors: Houyong Luo, Guangdong (CN); Peng Wu, Guangdong (CN)

(73) Assignee: DONGGUAN D-TEK TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/712,545

(22) PCT Filed: Nov. 26, 2021

(86) PCT No.: PCT/CN2021/133584
§ 371 (c)(1),
(2) Date: May 22, 2024

(87) PCT Pub. No.: WO2023/092470
PCT Pub. Date: Jun. 1, 2023

(65) Prior Publication Data
US 2025/0018491 A1    Jan. 16, 2025

(30) Foreign Application Priority Data
Nov. 23, 2021 (CN) .......................... 202111396772.8

(51) Int. Cl.
*B23K 3/06* (2006.01)
*B23K 101/42* (2006.01)

(52) U.S. Cl.
CPC ........ *B23K 3/0623* (2013.01); *B23K 2101/42* (2018.08)

(58) Field of Classification Search
None
See application file for complete search history.

(56) References Cited

U.S. PATENT DOCUMENTS

| 6,260,259 B1 * | 7/2001 | Kajii | ..................... B23P 19/007 29/714 |
| 8,328,068 B2 * | 12/2012 | Azdasht | ................... B23K 1/06 228/41 |

(Continued)

FOREIGN PATENT DOCUMENTS

| CN | 2933679 Y | * | 8/2007 |
| CN | 105108264 A | | 12/2015 |

(Continued)

OTHER PUBLICATIONS

International search report of PCT/CN2021/133584.

*Primary Examiner* — Devang R Patel (57) ABSTRACT

The invention discloses a single-headed tin ball implantation spray head, which comprises a spray head body, wherein a longitudinal blanking channel and a feeding channel communicated with the longitudinal blanking channel are respectively formed in the spray head body, and a feeding channel communicated with the feeding channel is formed on the spray head body; A blanking control mechanism is arranged on the main body of the spray head, and the blanking control mechanism corresponds to the position where the feed channel is communicated with the longitudinal blanking channel. The single-head solder ball implantation spray head can control the solder balls to move quickly in the spray head body and spray out from the nozzle one by one in an orderly manner, can accurately implant the solder balls on the surface of a circuit board, a wafer or a chip, can accurately control the solder balls with a particle size of more than 0.06 mm for ball implantation, and has high ball implantation efficiency, yield and accuracy, and is suitable for ball implantation of components with various shapes, models and sizes, with low processing cost and good operation stability.

10 Claims, 7 Drawing Sheets

(56) References Cited

U.S. PATENT DOCUMENTS

2006/0237514 A1* 10/2006 Wagou ................. B23K 3/0615
                                                                228/37
2013/0098975 A1*  4/2013 Ikeda .................. H01L 21/4853
                                                               228/248.1

FOREIGN PATENT DOCUMENTS

| CN | 206122840 U | * | 4/2017  |           |
|----|-------------|---|---------|-----------|
| CN | 106695055 A |   | 5/2017  |           |
| CN | 105171173 B | * | 12/2017 |           |
| CN | 110640251 A | * | 1/2020  | B23K 1/0056 |
| CN | 210587559 U |   | 5/2020  |           |
| CN | 112388098 A | * | 2/2021  | B23K 1/0056 |
| CN | 213857521 U |   | 8/2021  |           |
| CN | 213857522 U |   | 8/2021  |           |
| JP | 3724003 B2  | * | 12/2005 |           |
| JP | 2008264844 A |  | 11/2008 |           |

* cited by examiner

SINGLE-HEAD TIN BALL IMPLANTATION SPRAY HEAD

TECHNICAL FIELD

The invention relates to the technical field of semiconductor, electronic component packaging and electronic mounting equipment, in particular to a single-head solder ball implantation spray head.

BACKGROUND

Solder ball planting process is a process method of planting solder ball particles on the surface of components waiting for ball planting on circuit boards, wafers and chips. Solder ball planting process has gone through three stages: manual steel mesh ball planting, automatic steel mesh ball planting, and massive ball transplanting.

Among them, the principle of manual steel mesh ball planting is the same as that of automatic steel mesh ball planting, which mainly comprises the following steps: making tin material into spherical particles and pouring them on the hollowed-out steel mesh, at the same time, coating with a layer of flux on the surface of the element to be planted with balls and placing it under the hollowed-out steel mesh, then pouring tin balls on the steel mesh, scraping the tin balls with a scraper, and making the tin balls fall off the surface of the element from the hollowed-out part on the steel mesh; In the process of ball planting with steel mesh, it is necessary to control the distance between the steel mesh and the surface of the component within the sum of the diameters of two tin balls, which requires higher requirements on the flatness of the steel mesh and the surface of the component to be ball planted. In the process of use, the steel mesh is easily deformed and damaged by the squeezing force of the scraper and often needs to be replaced. At the same time, the flatness of the steel mesh is also affected by the area, and the more easily the steel mesh area is deformed, the large-area ball planting cannot be carried out; Screen printing is also not suitable for components with uneven surface (such as components with curved surface structure or components with pre-attached surface); Moreover, due to the gradual development of miniaturization of electronic products, when planting tiny components, the particle diameter of solder balls used is very small. The smaller the diameter of solder balls is, the larger the specific surface area is, and the greater the adsorption force on the surface of solder balls is, which easily leads to the phenomenon that solder balls are piled up or adsorbed on the steel mesh, which leads to the phenomenon of missing ball planting and reduces the yield and efficiency of ball planting, At the same time, the smaller the diameter of the solder ball, the more difficult it is to process the steel mesh, and the higher the cost. The existing technology can not process the steel mesh with the aperture below 0.1 mm, which limits the use of the steel mesh ball planting equipment.

The technology of transferring a huge amount of transplanted balls is to use a suction head to suck up solder balls by vacuumizing, then transfer them to the surface of the element to be implanted, and use gas to blow off the solder balls to complete the ball implantation. In order to improve the ball implantation efficiency, a suction cup is clamped on the suction head, and the suction cup is provided with adsorption holes, so that the number of solder balls corresponding to the adsorption holes can be sucked up at one time, When in use, in order to accurately drop the solder ball at the corresponding position at the same time, the distance between the suction head and the surface of the component to be implanted with the ball is required to be very small, so this process is not applicable to components with uneven surfaces (such as components with curved surface structures or components with pre-attached surfaces); The smaller the adsorption hole on the sucker, the more difficult it is to process, and the higher the processing cost, so it can not be applied to tin balls with aperture less than 0.1 mm for ball planting. However, when planting the ball on a large surface, a large number of adsorption holes need to be opened on the sucker, which will also lead to the increase of the processing cost of the sucker and limit the use of this technology. Moreover, when the diameter of the solder ball or the model of the component to be soldered changes, it is necessary to replace the suction cup or even the whole suction head at the same time, thus increasing the cost.

Therefore, the prior art still lacks a ball-planting device which is suitable for different component shapes and different solder ball particle sizes, and has high ball-planting efficiency and low processing cost.

SUMMARY

In view of the above shortcomings, it is an object of the present invention to provide a single-headed solder ball implantation spray head, which can control the solder balls to move rapidly in the spray head body and spray out from the nozzle one by one in an orderly manner, can accurately implant the solder balls on the surface of a circuit board, a wafer or a chip, can accurately control the solder balls with a particle size of more than 0.06 mm for ball implantation, and has high ball implantation efficiency, yield and accuracy, It is suitable for ball planting of components with various shapes, models and sizes, with low processing cost and good equipment operation stability.

The technical scheme adopted by the invention for achieving the above purpose is as follows: The invention relates to a single-headed tin ball implantation spray head, which comprises a spray head body, wherein a longitudinal blanking channel and a first feeding channel communicated with the longitudinal blanking channel are respectively formed in the spray head body, and a second feeding channel communicated with the first feeding channel is formed on the spray head body, and a nozzle communicated with the longitudinal blanking channel is arranged on the spray head body; Meanwhile, a blanking control mechanism is arranged on the main body of the spray head, and the blanking control mechanism comprises a blanking control gas path, a ventilation channel and a vacuum channel, wherein the blanking control gas path, the ventilation channel and the vacuum channel are respectively connected to a first electromagnetic valve, The blanking control gas path is communicated with the position where the first feeding channel is communicated with the longitudinal blanking channel, and the spray head main body comprises:

a Lower part: The longitudinal blanking channel is formed in the lower part, the first feeding channel is formed at the upper end of the lower part, and the nozzle is arranged at the lower end of the lower part;

An upper part: Which is positioned above the lower part, and the ventilation channel, the vacuum channel and the second feeding channel are all formed on the upper part;

A basic block A: It is located between the upper part and the lower part, and the blanking control gas path is formed on the base block A.

As a further improvement of the invention, the blanking control mechanism further comprises a buffer control gas path formed on the base block A and communicated with the feed channel, and the buffer control gas path, the vacuum channel and the ventilation channel are respectively connected to a second electromagnetic valve, and the second electromagnetic valve is arranged on the upper part.

As a further improvement of the invention, the blanking control mechanism further comprises a blowing gas path formed on the base block A and communicated with the second feeding channel, and the blowing gas path and the ventilation channel are respectively connected to a third electromagnetic valve, and the third electromagnetic valve is arranged on the upper part.

As a further improvement of the invention, the blanking control gas path is provided with a first vent hole corresponding to the communication position between the longitudinal blanking channel and the first feeding channel; The buffer control gas path is provided with a second vent hole corresponding to the feed channel.

As a further improvement of the invention, one end of the blanking control gas path near the first vent hole forms a first bending part, and the width of the first bending part gradually decreases from the bending part to the first vent hole; One end of the buffer control gas path near the second vent hole forms a second bending part, and the width of the second bending part gradually decreases from the bending part to the second vent hole.

As a further improvement of the present invention, the spray head body further comprises a base block B, which is arranged between the base block A and the lower part. The feed channel is formed on the base block B, and a blanking port corresponding to the longitudinal blanking channel is formed on the feed channel. The first vent hole is communicated with the blanking port, and the second vent hole is communicated with the position of the feed channel near the blanking port.

As a further improvement of the invention, the base block B comprises an upper base block B and a lower base block B located below the upper base block B, The first feeding channel is formed on the upper base block B, and a lower channel located below the first feeding channel is formed on the lower base block B, wherein the lower channel extends along the length direction of the first feeding channel and communicates with the blanking port, and the width of the lower channel is smaller than that of the first feeding channel.

As a further improvement of the present invention, a first communication hole communicating with the first electromagnetic valve and the blanking control gas path, a second communication hole communicating with the second electromagnetic valve and the buffer control gas path, and a third communication hole communicating with the third electromagnetic valve and the blowing channel are respectively formed on the upper part; The upper part is also provided with a feeding tube connected with the second feeding channel.

As a further improvement of the invention, the lower end of the second feeding channel has an inverted cone structure, and the cross section of the lower end of the second feeding has an elliptical structure; A feeding accumulation groove matched with the lower end of the second feeding channel is formed on the blowing gas path below the second feeding channel, and the cross section of the feeding accumulation groove has an elliptical structure, and the end of the second feeding channel extends below the feeding accumulation groove and coincides with the long axis of the feeding accumulation groove.

As a further improvement of the invention, an injection channel communicated with the longitudinal blanking channel is formed in the nozzle.

The single-head tin ball implantation spray head of the invention has the beneficial effects that: By arranging a communication channel consisting of a second feeding channel, a first feeding channel and a longitudinal blanking channel in the main body of the spray head for the movement of the tin balls, At the same time, by setting the blanking control mechanism, the process that the solder balls fall from the first feeding channel into the longitudinal blanking channel is controlled, so that the solder balls fall sequentially, accurately and quickly, and the solder balls are ejected from the nozzle one by one, which is convenient for improving the precision and efficiency of the solder ball planting, and has a simple structure and a small overall volume; In the blanking control mechanism, the blanking control gas path, the ventilation channel and the vacuum channel are isolated from each other, and are only connected through the first electromagnetic valve, so that the phenomenon of air leakage and gas cross-talk does not occur, which is beneficial to the precise control of the blanking control mechanism on the solder balls; And can quickly suck up and blow off the tin ball by controlling the switching frequency of the electromagnetic valve, and can also be quickly completed when planting the ball in a large area; It can accurately control the solder balls with a particle size of more than 0.06 mm for ball planting, without the phenomenon that the solder balls accumulate and miss the ball planting, and is suitable for ball planting of components with various shapes, models and sizes; Low processing cost and good operation stability.

The above is an overview of the technical scheme of the invention, and the invention will be further explained with the attached drawings and specific embodiments.

EMBODIMENTS

In order to further illustrate the technical means and effects adopted by the present invention to achieve the predetermined purpose, the specific embodiments of the present invention will be described in detail with the attached drawings and preferred embodiments.

Please refer to FIG. 1 to FIG. 4, An embodiment of the present invention provides a single-headed solder ball implantation spray head, which comprises a spray head main body 1, in which a longitudinal blanking channel 2 and a first feeding channel 3 communicating with the longitudinal blanking channel 2 are respectively formed, and a second feeding channel 4 communicating with the first feeding channel 3 is formed on the spray head main body 1, and a nozzle 5 communicating with the longitudinal blanking channel 2 is arranged on the spray head main body 1; At the same time, the spray head body 1 is provided with a blanking control mechanism corresponding to the position where the longitudinal blanking channel 2 communicates with the feed channel 3;

The tin balls are fed from the second feeding channel 4 and enter the first feeding channel 3 in turn; Then it falls into the longitudinal blanking channel 2 in turn, and falls to the nozzle 5 along the longitudinal blanking channel 2 under its own gravity. Finally, it is sprayed from the nozzle 5 to be implanted on the surface of the component to be implanted, so that the solder balls with a particle size of more than 0.06 mm can be accurately controlled for ball implantation, and there is no problem of tin ball adsorption and accumulation, and it is not affected by the shape of the component, which is beneficial to improving the precision and efficiency of ball implantation.

In the above process, by setting the blanking control mechanism, the process that the solder balls fall from the feed channel 3 into the longitudinal blanking channel 2 is controlled, so that the solder balls fall sequentially, accurately and quickly, and the time when each solder ball falls into the longitudinal blanking channel 2 can be controlled, so that the solder balls are ejected from the nozzle 5 one by one, which is convenient to improve the precision and speed of the solder ball planting.

Specifically, the blanking control mechanism comprises a blanking control gas path 61, a ventilation channel 71 and a vacuum channel 72, wherein the blanking control gas path 61, the ventilation channel 71 and the vacuum channel 72 are respectively connected to a first electromagnetic valve 81, and the blanking control gas path 61 is communicated with the position where the first feeding channel 3 communicates with the longitudinal blanking channel 2, namely the blanking port 31 described below;

The ventilation channel 71 communicates with the external compressed gas, and the vacuum channel 72 communicates with the external vacuum extractor.

In order to prevent the solder balls from being oxidized, inert gas is introduced into the ventilation channel 71, and in this embodiment, nitrogen is introduced into the ventilation channel 71.

When the first solenoid valve 81 turns on the ventilation channel 71 and turns off the connection with the vacuum channel 72, gas is introduced into the blanking control gas channel 61 from the ventilation channel 71 and blown into the longitudinal blanking channel 2 from the blanking control gas channel 61, so that the solder balls entering the blanking port 31 from the feed channel 3 are quickly and accurately blown into the longitudinal blanking channel 2, Compared with falling down by the weight of the solder ball, the method of blowing air is adopted, which obviously improves the falling speed of the solder ball and improves the working efficiency.

Next, the next solder ball moves to the blanking port 31; At the same time, the first solenoid valve 81 turns off the communication with the ventilation channel 71, but turns on the blanking control gas channel 61 and the vacuum channel 72, and vacuum adsorption is carried out on the blanking control gas channel 61 through the vacuum channel 72, so that the solder balls entering the blanking port 31 from the feed channel 3 stop falling into the longitudinal blanking channel 2 until the last solder ball is ejected from the nozzle 5.

Then, the above process is repeated, and the vacuum mode is changed into the blowing mode, so that the solder balls are controlled to fall into the longitudinal blanking channel 2 one by one, and are ejected from the nozzle 5 one by one, thereby effectively improving the accuracy of ball planting. By controlling the switching frequency of the electromagnetic valve, the solder balls can be quickly sucked up and blown off, and it can also be quickly completed when planting balls in a large area.

In this embodiment, the jet head main body 1 includes:
An Lower part 11: The longitudinal blanking channel 2 is formed in the lower part 11, the first feeding channel 3 is formed at the upper end of the lower part 11, and the nozzle 5 is arranged at the lower end of the lower part 11;
An upper portion 12: It is located above the lower part 11, and the ventilation channel 71, vacuum channel 72 and second feeding channel 4 are all formed in the upper part 12.
A basic block A13: It is located between the upper part 12 and the lower part 11, and the blanking control gas path 61 is formed on the base block A13.

In this way, the blanking control air passage 61, the ventilation passage 71 and the vacuum passage 72 are isolated from each other, and are connected only by the first electromagnetic valve 81, so that gas cross-talk will not occur, which is beneficial to the precise control of the blanking control mechanism on the solder balls, so that the solder balls can enter the longitudinal blanking passage 2 one by one in an orderly manner, thus effectively improving the accuracy of solder ball planting, having low processing cost and good equipment operation stability.

From the above process, it can be known that when the solder balls at the communicating position between the longitudinal blanking channel 2 and the first feeding channel 3 are vacuumized and adsorbed, in order to prevent the next solder ball from moving forward too fast and hitting the adsorbed solder balls, which will affect the vacuum adsorption, In this embodiment, the blanking control mechanism further includes a buffer control air path 62 formed on the base block A13 and communicated with the first feeding channel 3. The buffer control air path 62, the vacuum channel 72 and the ventilation channel 71 are respectively connected to a second electromagnetic valve 82, and the second electromagnetic valve 82 is arranged on the upper part 12. When the second solenoid valve 81 connects the buffer control air passage 62 and the vacuum passage 72, the buffer control air passage 62 and the vacuum passage 72 are vacuumized, and the solder balls behind the blanking port 31 are vacuumized and adsorbed, so that the solder balls behind the blanking port 31 stop moving to the blanking port 31; When the solder balls on the blanking port 31 are blown into the longitudinal blanking channel 2, the second solenoid valve 82 turns off the connection between the buffer control air channel 62 and the vacuum channel 72, and turns on the buffer control air channel 62 and the ventilation channel 71, so that the solder balls behind the blanking port 31 are blown off, At the same time, the first solenoid valve 81 connects the blanking control air passage 61 with the ventilation passage 71, which is in a vacuum adsorption state, thereby adsorbing the blown solder balls to the blanking port 31. Therefore, the tin balls can move forward in sequence without interference with each other, so that the whole action process can be carried out in an orderly and stable manner, thus improving the accuracy and efficiency of the whole injection ball planting.

In this embodiment, in order to enable the solder balls on the first feeding channel 3 to move smoothly and sequentially in the direction of the blanking port 31, the blanking control mechanism further includes an air blowing air path 63 formed on the base block A13 and communicated with the second feeding channel 4, and the air blowing air path 63 and the ventilation channel 71 are respectively connected to a third electromagnetic valve 83, and the third electromagnetic valve 83 is arranged on the upper part 11.

When in use, one end of the spray head main body 1 close to the longitudinal blanking channel 2 can also be inclined downward at a certain angle, so that the feed channel 3 has a certain inclination, and the solder balls roll forward under the action of their own gravity after entering the feed channel 3.

Figure 5:
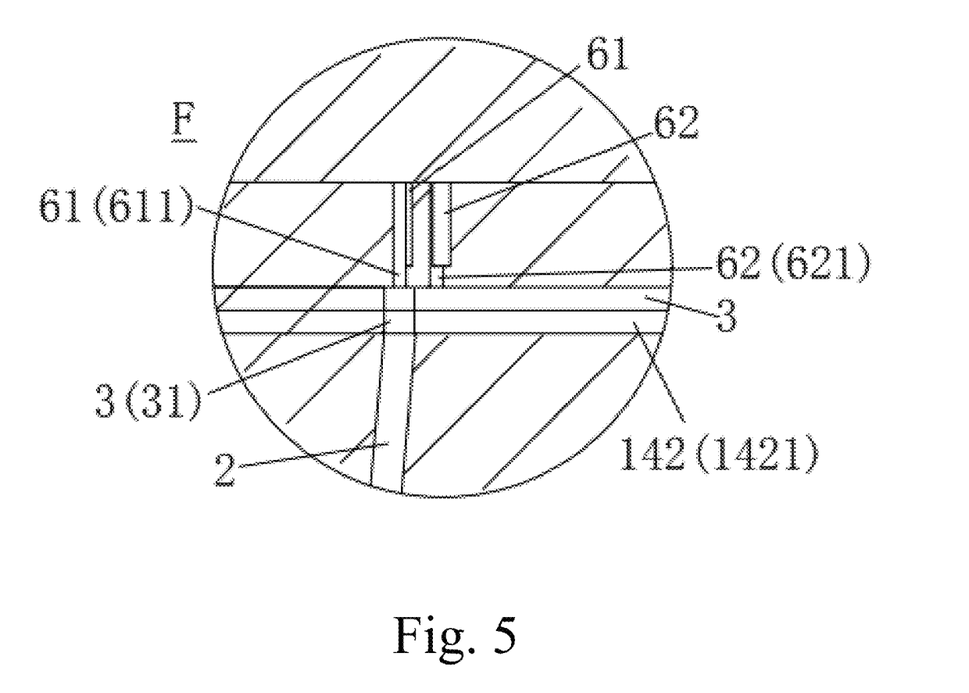
FIG. 5 Is a partial enlarged view of the position F in FIG. 4.
Figure 9:
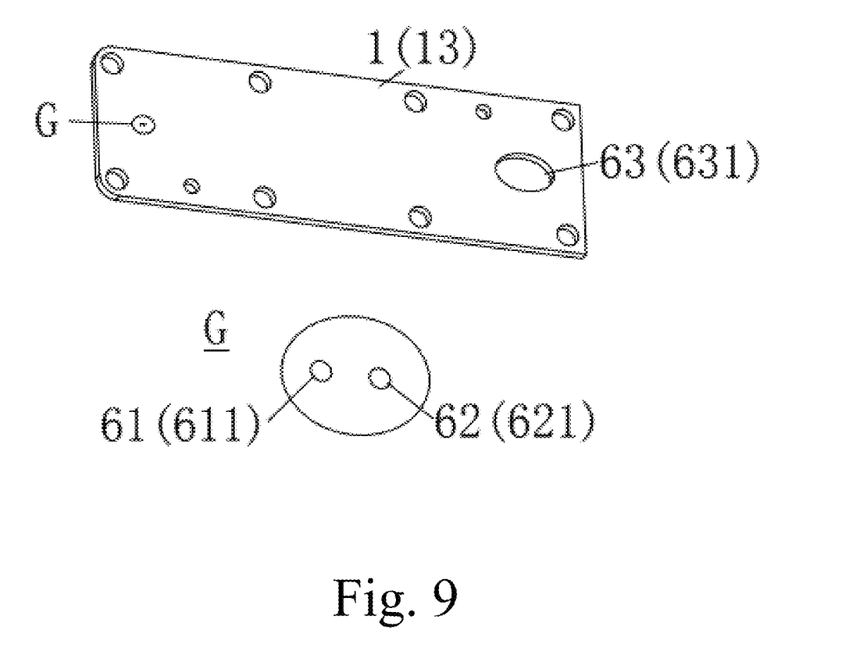
FIG. 9 For the structural diagram of the base block A and the partial enlarged view of the position G in the single-headed tin ball implantation spray head of the present invention.

In this embodiment, as shown in FIGS. 5 and 9, the blanking control gas path 61 has a first vent hole 611 corresponding to the position where the longitudinal blanking channel 2 communicates with the first feeding channel 3; The buffer control gas path 62 has a second vent hole 621 corresponding to the feed channel 3. Thus, the blanking control gas path 61 communicates with the longitudinal blanking channel 2 and the buffer control gas path 62 communicates with the feed channel 3.

At the same time, the distance between the position where the first vent hole 611 acts on the longitudinal blanking channel 2 and the position where the second vent hole 621 acts on the first feeding channel 3 is larger than the diameter of the solder balls and smaller than the sum of the diameters of the two solder balls, so that the balls are prevented from being hidden between the first vent hole 611 and the second vent hole 621, and the solder balls are better controlled to enter the longitudinal blanking channel 2 one by one.

Figure 6:
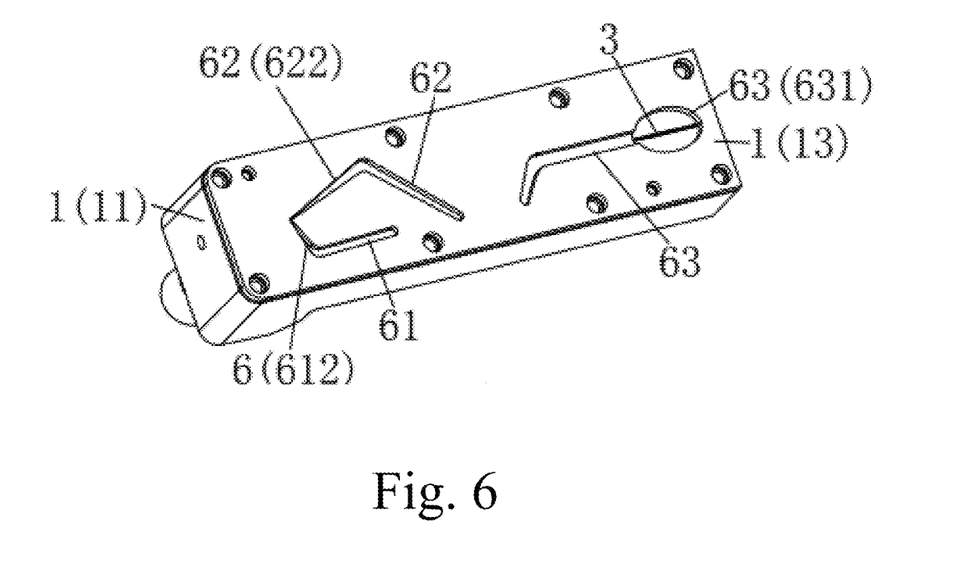
FIG. 6 This is the connection structure diagram of the part of the spray head body below the base block A in the single-headed tin ball implantation spray head of the present invention.

As shown in FIG. 6, one end of the blanking control gas path 61 near the first vent hole 611 forms a first bending part 612, and the width of the first bending part 612 gradually decreases from the bending part to the first vent hole 611; The blanking control air passage 61 is designed in a bent shape, and one end connected with the longitudinal blanking passage 2 has a sharp nozzle structure, so that when the blanking control air passage 61 communicates with the ventilation passage 71, a stable air flow can be formed in the blanking control air passage 61, and when the blanking control air passage 61 communicates with the vacuum passage 72, a stable vacuum state can be formed. One end communicating with the longitudinal blanking channel 2 has a sharp nozzle structure, which increases the strength of blowing and sucking of the first vent hole 611, effectively sucks and blows off the solder balls, and is beneficial to improving the accuracy and speed of ball planting.

Similarly, one end of the buffer control gas path 62 near the second vent hole 621 forms a second bending part 622, and the width of the second bending part 622 gradually decreases from the bending part to the second vent hole 621; It is beneficial to buffer and control a stable airflow or a stable vacuum state in the air passage 62, and at the same time, the strength of blowing and inhaling the solder balls by the second vent hole 621 is increased, so as to realize accurate control of the solder balls.

Figure 1:
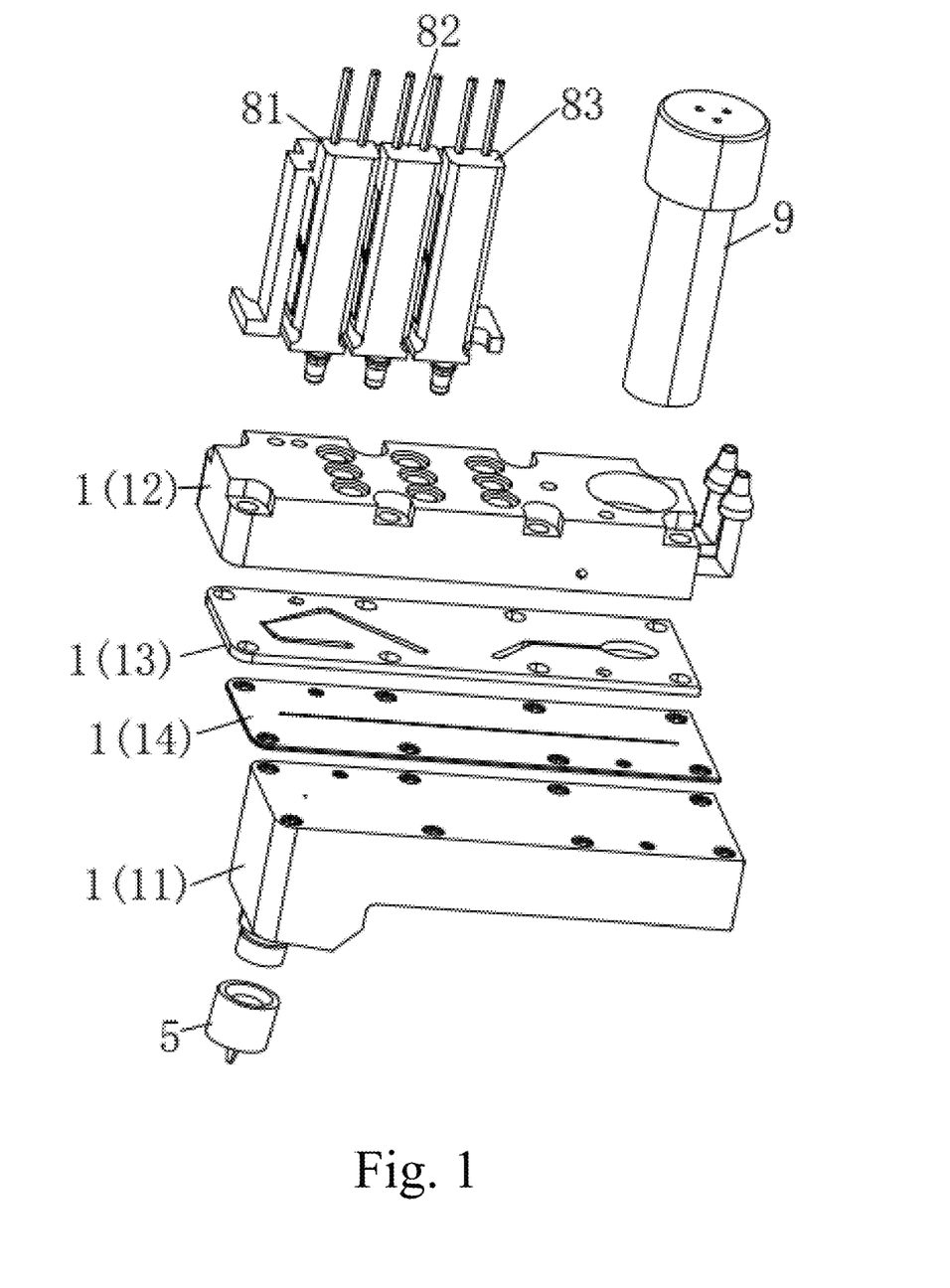
FIG. 1 The explosion diagram of the single-head tin ball implantation spray head of the present invention.
Figure 2:
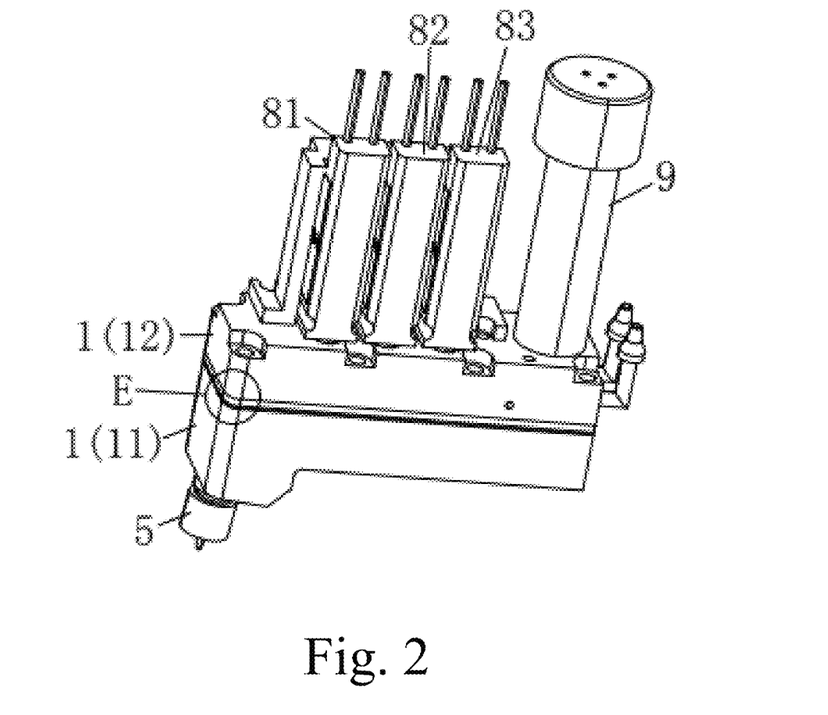
FIG. 2 The structure diagram of the single-head tin ball implantation spray head of the present invention.
Figure 3:
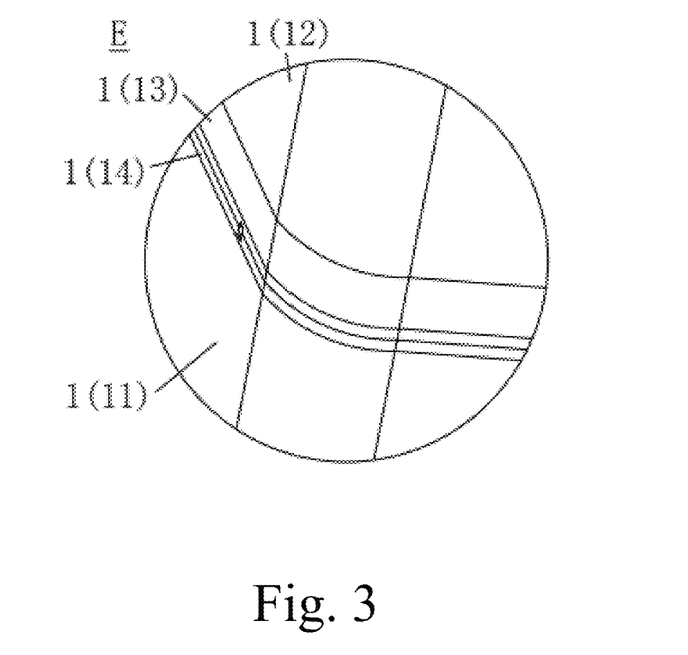
FIG. 3 Is a partial enlarged view of the position E in FIG. 2.
Figure 10:
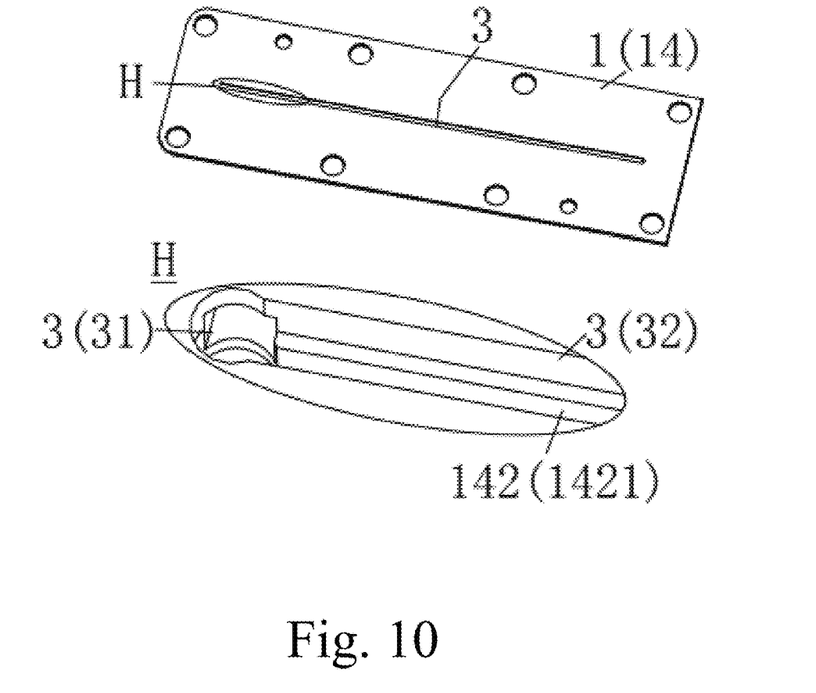
FIG. 10 The structural schematic diagram of the base block B and the partial enlarged view of the position H in the single-headed tin ball implantation spray head of the present invention.

As shown in FIG. 1 and FIG. 10, in order to facilitate processing, the jet head body 1 further comprises a base block B14, which is arranged between the base block A13 and the lower part 11. The feed channel 3 is formed on the base block B14, and a blanking port 31 corresponding to the longitudinal blanking channel 2 is formed on the feed channel 3, The first vent hole 611 communicates with the blanking port 31, and the second vent hole 621 communicates with the position of the feed channel 3 near the blanking port 31.

Figure 11:
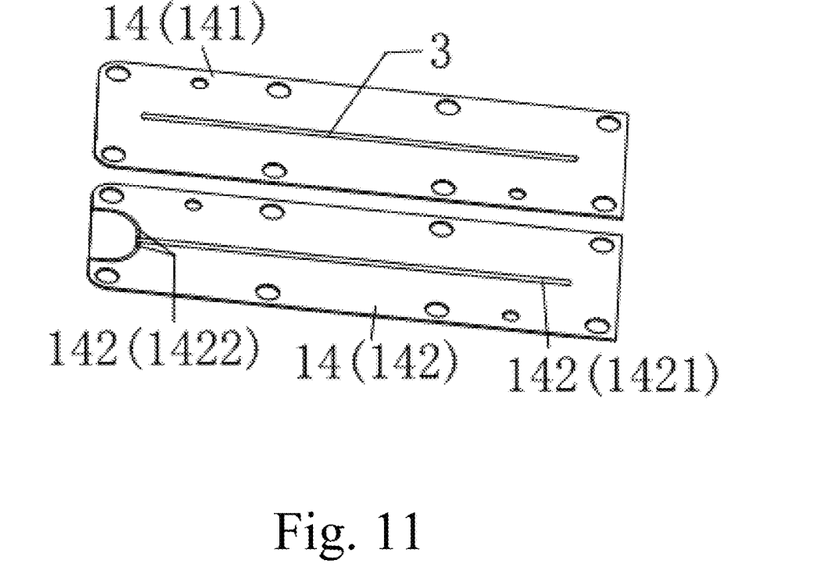
FIG. 11 This is the explosion diagram of the base block B in the single-headed tin ball implantation spray head of the present invention.
Figure 12:
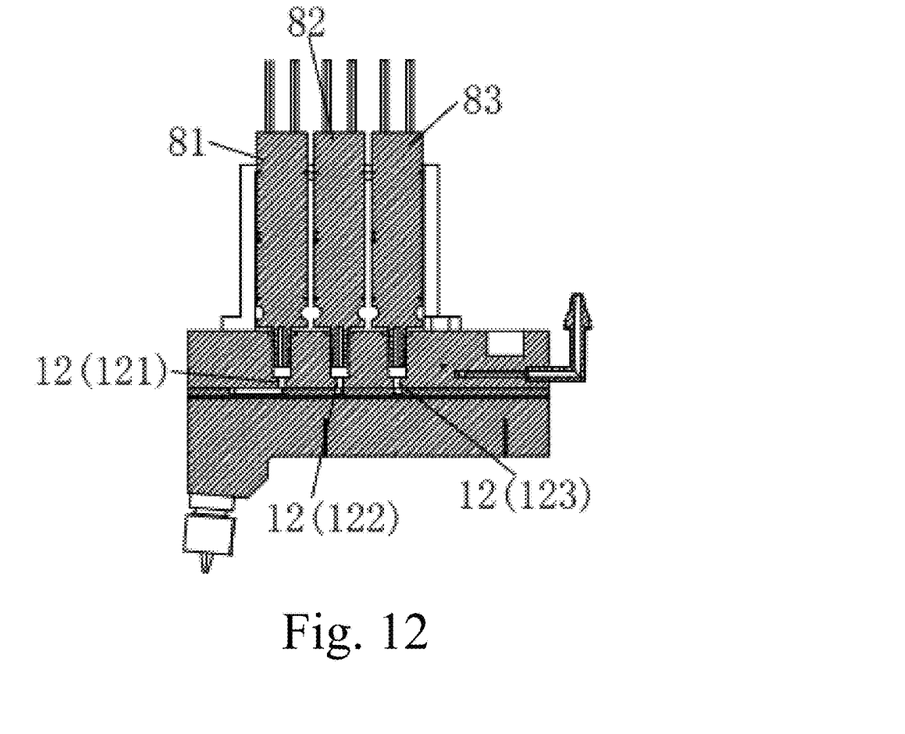
FIG. 12 This is a sectional view of another position of the single-headed tin ball implantation spray head of the present invention.
Figure 13:
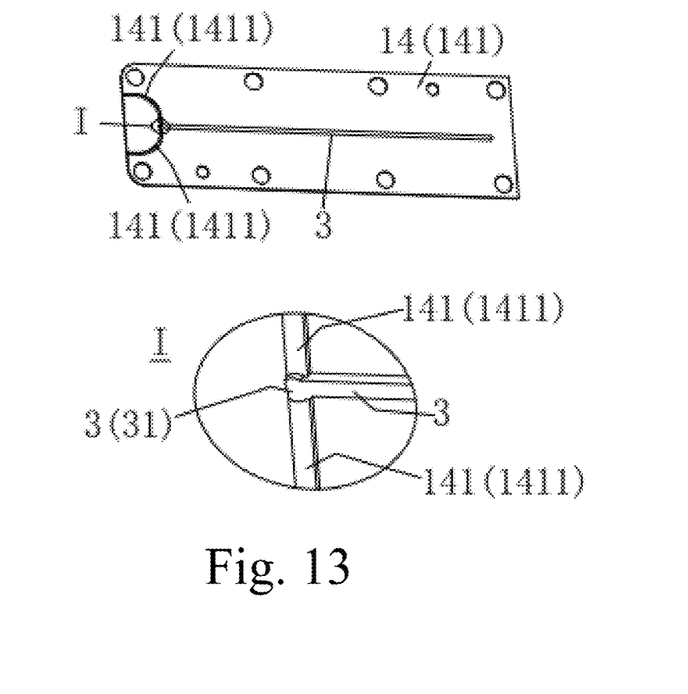
FIG. 13 This is a structural diagram of the bottom of the upper base block B and a partial enlarged view of the position I in the single-headed tin ball implantation spray head of the present invention.

As shown in FIGS. 11 and 12, the base block B14 includes an upper base block B141 and a lower base block B142 located below the upper base block B141, The first feeding channel 3 is formed in the upper base block B141, and a lower channel 1421 located below the first feeding channel 3 is formed in the lower base block B142, wherein the lower channel 1421 extends along the length direction of the first feeding channel 3 and communicates with the blanking port 31, and the width of the lower channel 1421 is smaller than that of the first feeding channel 3. Specifically, the width of the feed channel 3 is larger than the diameter of the solder balls and smaller than the sum of the diameters of the two solder balls, the width of the lower channel 1421 is smaller than the diameter of the solder balls, and the depth of the feed channel 3 is larger than the diameter of the solder balls and smaller than the sum of the diameters of the two solder balls. In this way, only one tin ball can be accommodated in each position of the feed channel 3, so that the phenomenon that the tin ball is blocked due to accumulation will not occur. At the same time, when the blowing air path 63 blows air and blows the tin ball to move along the feed channel 3, the lower channel 1421 has a guiding effect on the movement of the tin ball, so that the tin ball moves in a straight line in the feed channel 3, Moreover, the periphery of the solder ball is filled with gas, so that the solder ball is suspended in the gas, which reduces the friction caused by the contact of the solder ball with the feed channel 3, so that the solder ball can move forward more quickly and smoothly, further reducing the moving time of the solder ball inside the spray head body 1, and improving the ball planting efficiency of the solder ball.

An upper groove 1411 is formed on the upper base block B141 and located at two opposite sides of the blanking port 31, a lower groove 1422 matched with the upper groove 1422 is formed on the lower base block B142, and an optical fiber sensor is arranged on the base block B14 between the upper groove 1411 and the lower groove 1422. Specifically, the optical fiber sensor has a light emitting end and a light receiving end. By arranging the light emitting end and the light receiving end on both sides of the blanking port 31, when there are solder balls in the blanking port 31, the light emitted by the light emitting end is blocked by the solder balls, and the light receiving end cannot receive the light emitted by the light emitting end. At this time, the system judges that there are balls in the blanking port 31; When there is no solder ball at the blanking port 31, the light receiving end can normally receive the light emitted by the light emitting end. At this time, the system judges that there is no solder ball at the blanking port 31, and informs the system whether there is a ball at the blanking port 31 through the detection result of the optical fiber sensor, so as to judge whether the ball planting is normal every time, which is convenient for subsequent maintenance, preventing the phenomenon of missing ball planting and improving the product yield.

Figure 8:
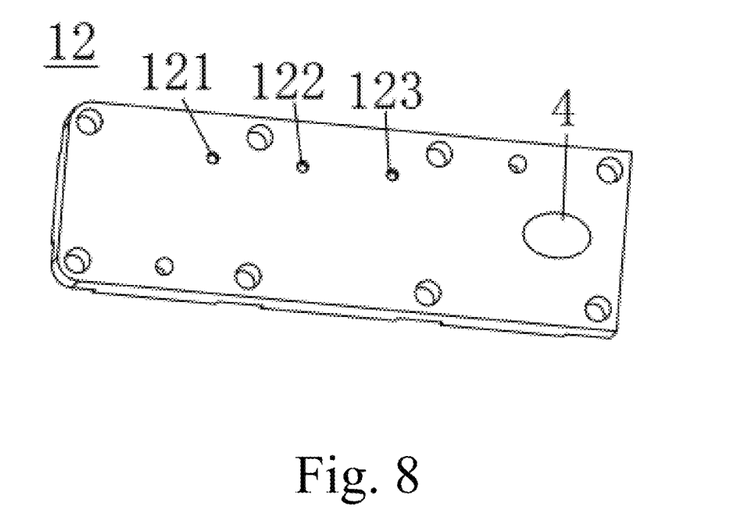
FIG. 8 This is the bottom structure of the base block C in the single-headed tin ball implantation spray head of the present invention.

As shown in FIGS. 8 and 12, a first communication hole 121 communicating the first solenoid valve 81 with the blanking control gas path 61 is formed in the upper portion 12, respectively, A second communication hole 122 communicating with the second solenoid valve 82 and the buffer control air passage 62, and a third communication hole 123 communicating with the third solenoid valve 83 and the air blowing passage 63; The upper part 12 is also provided with a feeding tube 9 connected with the second feeding channel 4.

Of course, in order to facilitate the processing, a base block C (not shown in the drawing) can be arranged between the upper part 12 and the base block A13, and the first communication hole 121, the first communication hole 122 and the third communication hole 123 are all arranged on the base block C.

Figure 4:
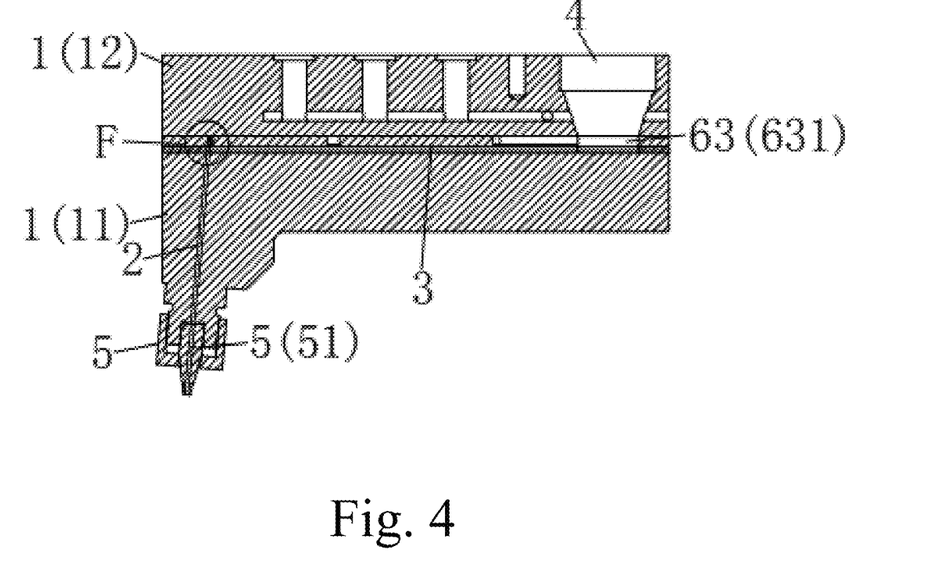
FIG. 4 The invention is a sectional view of a position of a single-head tin ball implantation spray head.

As shown in FIG. 4, FIG. 6 and FIG. 9, the lower end of the second feeding channel 4 has an inverted cone structure, and the cross section of the lower end of the second feeding channel 4 has an elliptical structure. At the same time, a second feeding accumulation groove 631 matched with the lower end of the second feeding channel 4 is formed on the blowing gas path 63 and below the second feeding channel 4. The cross section of the feeding accumulation groove 631 has an elliptical structure, and the end of the feeding channel 3 extends below the feeding accumulation groove 631 and coincides with the long axis of the feeding accumulation groove 631. When the charging accumulation groove 631 is blown by the blowing gas path 63, the side wall of the charging accumulation groove 631 with an elliptical structure has a guiding effect on the gas flow, so that the gas flows along the two side walls, so that the gas flow is formed at the middle part and the two side edges of the charging accumulation groove 631, thereby effectively blowing the solder balls. At the same time, the lower end of the second feeding channel 4 has an inverted cone structure, so that the tin balls have enough loosening space in the vertical direction, which is beneficial to blow away the accumulated tin balls and smoothly enter the first feeding channel 3, thus improving the ball planting efficiency of the equipment.

Figure 7:
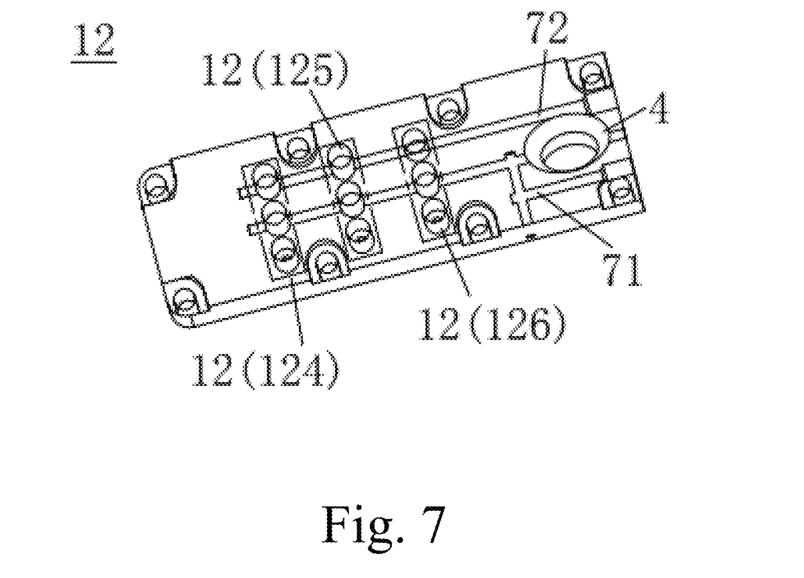
FIG. 7 The internal structure diagram of the middle and upper part of the single-head tin ball implantation spray head of the present invention.

In order to improve the compactness of the single-head ball planting equipment and reduce the manufacturing cost, as shown in FIG. 7, the ventilation channel 71 and the vacuum channel 72 are arranged side by side in the upper part 11 and extend in the direction of the feed channel 3, respectively, A first jack group 124 for inserting the first solenoid valve 81, a second jack group 125 for inserting the second solenoid valve 82 and a third jack group 126 for inserting the third solenoid valve 83 are formed on the upper part 12, The third jack group 123 is close to one end of the second feeding channel 4, the first jack group 121 is close to one end of the longitudinal blanking channel 2, and the ventilation channel 71, the vacuum channel 72 and the first communication hole 121 are respectively communicated with the first jack group 124. The ventilation channel 71, the vacuum channel 72 and the second communication hole 122 are respectively communicated with the second jack group 125; The ventilation channel 71, the vacuum channel 72 and the third communication hole 123 are respectively communicated with the third jack group 126.

As shown in FIG. 4, an injection channel 51 communicating with the longitudinal blanking channel 2 is formed in the nozzle 5. After the solder balls enter the nozzle 5 from the longitudinal blanking channel 2, they are ejected along the ejection channel 51, which improves the accuracy of solder ball planting.

The above is only a preferred embodiment of the present invention, and does not limit the technical scope of the present invention, so other structures obtained by adopting the same or similar technical features as the above embodiment of the present invention are within the protection scope of the present invention.

The invention claimed is:

1. A single-headed tin ball implantation spray head, comprising a spray head body,
   wherein a longitudinal channel and a first feeding channel communicated with the longitudinal channel are respectively formed in the spray head body, and a second feeding channel communicated with the first feeding channel is formed on the spray head body, and a nozzle communicated with the longitudinal channel is arranged on the spray head body; a control mechanism is arranged on the spray head body, and the control mechanism comprises a first control gas path, a ventilation channel and a vacuum channel the first control gas path, the ventilation channel and the vacuum channel are respectively connected to a first electromagnetic valve, and the first control gas path is communicated with a communicating position of the first feeding channel and the longitudinal channel,
   the spray head body comprises a
   lower part, an upper part, the nozzle and a first base block, the longitudinal channel is formed in the lower part, the first feeding channel is formed at an upper end of the lower part, and the nozzle is arranged at a lower end of the lower part;
   the upper part is positioned above the lower part, and the ventilation channel, the vacuum channel and the second feeding channel are all formed on the upper part;
   the first base block is located between the upper part and the lower part, and the first control gas path is formed on the first base block;
   when the first solenoid valve turns on the ventilation channel and turns off the vacuum channel, a gas is introduced into the first control gas path from the ventilation channel and blown into the longitudinal channel from the first control gas path, such that a former solder ball is blown into the longitudinal channel;
   when the first solenoid valve turns off the ventilation channel and turns on the first control gas path and the vacuum channel, and a vacuum suction is carried out in the first control gas path through the vacuum channel, such that a latter solder ball is stopped from falling into the longitudinal channel until the former solder ball is ejected from the nozzle.

2. The single-headed solder ball implantation spray head according to claim 1, wherein the control mechanism further comprises a second control gas path formed on the first base block and communicated with the first feeding channel, and the second control gas path, the vacuum channel and the ventilation channel are respectively connected to a second electromagnetic valve, and the second electromagnetic valve is arranged on the upper part;

when the second solenoid valve connects the second control gas path and the vacuum channel, a vacuum suction is carried out in the second control gas path through the vacuum channel, such that a solder ball following the latter solder ball is stopped from moving until the latter solder ball is blown into the longitudinal channel.

3. The single-headed solder ball implantation spray head according to claim 2, wherein the control mechanism further comprises a blowing gas path formed on the first base block and communicated with the second feeding channel, and the blowing gas path and the ventilation channel are respectively connected to a third electromagnetic valve, and the third electromagnetic valve is arranged on the upper part.

4. The single-headed solder ball implantation spray head according to claim 2, wherein the first control gas path is provided with a first vent hole corresponding to the communication position between the longitudinal channel and the first feeding channel; the second control gas path is provided with a second vent hole corresponding to the first feeding channel.

5. The single-headed solder ball implantation spray head according to claim 4, wherein one end of the first control gas path close to the first vent hole forms a first bending part, and a width of the first control gas path gradually decreases from the first bending part to the first vent hole; one end of the second control gas path near the second vent hole forms a second bending part, and a width of the second control gas path gradually decreases from the second bending part to the second vent hole.

6. The single-headed solder ball implantation spray head according to claim 4, wherein the spray head body further comprises a second base block arranged between the first base block and the lower part, the first feeding channel is formed on the second base block, and a port corresponding to the longitudinal channel is formed on the first feeding channel, the first vent hole is communicated with the port, and the second vent hole is communicated with a position of the first feeding channel near the port.

7. The single-headed solder ball implantation spray head according to claim 6, wherein the second base block comprises an upper base block and a lower base block located below the upper base block, the second feeding channel is formed in the upper base block, and a lower channel located below the first feeding channel is formed on the lower base block, wherein the lower channel extends along a length direction of the first feeding channel and is communicated with the port, and a width of the lower channel is smaller than that of the first feeding channel.

8. The single-headed solder ball implantation spray head according to claim 3, wherein a first communication hole communicating with the first electromagnetic valve and the first control gas path, a second communication hole communicating with the second electromagnetic valve and the second control gas path, and a third communication hole communicating with the third electromagnetic valve and the blowing channel are respectively formed on the upper part; the upper part is also provided with a second feeding tube connected with the second feeding channel.

9. The single-headed solder ball implantation spray head according to claim 3, wherein a longitudinal cross section of a lower end of the second feeding channel has an inverted cone structure, and a transverse cross section of the lower end of the second feeding channel has an elliptical structure; a feeding accumulation groove matched with the lower end of the second feeding channel is formed on the blowing gas path below the second feeding channel, and a transverse cross section of the feeding accumulation groove has an elliptical structure, and an end of the first feeding channel extends below the feeding accumulation groove and coincides with a long axis of the feeding accumulation groove.

10. The single-headed solder ball implantation spray head according to claim 9, wherein an injection channel communicated with the longitudinal channel is formed in the nozzle.

* * * * *